United States Patent [19]
Xu et al.

[11] Patent Number: 5,748,817
[45] Date of Patent: May 5, 1998

[54] FIBER OPTIC COUPLER PACKAGE HAVING A COVER OVERLAPPING THE BASE

[75] Inventors: David Jisen Xu, Sunnyvale; Sanjay Sudeora, Cupertino, both of Calif.

[73] Assignee: The Whitaker Corporation, Wilmington, Del.

[21] Appl. No.: 684,764

[22] Filed: Jun. 28, 1996

[51] Int. Cl.$^6$ ............................................ G02B 6/26
[52] U.S. Cl. ........................ 385/51; 385/65; 385/83; 385/99
[58] Field of Search ..................... 385/51, 52, 49, 385/42, 50, 95–99, 65, 83

[56] References Cited

U.S. PATENT DOCUMENTS

| | | | |
|---|---|---|---|
| 4,714,316 | 12/1987 | Moore et al. | 385/99 X |
| 5,247,598 | 9/1993 | Takimoto et al. | 385/99 |
| 5,367,591 | 11/1994 | Seike et al. | 385/51 |

Primary Examiner—Phan T. H. Palmer

[57] ABSTRACT

An optical fiber coupler package comprising an base member having a longitudinal groove disposed therein, and a cover member for the base member, wherein the cover member is shorter in length than the base member and wide enough to completely overlap the groove when placed so as to cover the base member.

11 Claims, 2 Drawing Sheets

FIBER OPTIC COUPLER PACKAGE HAVING A COVER OVERLAPPING THE BASE

BACKGROUND OF THE INVENTION

1. Field of the Invention

Fiber optic couplers have found increasing usage with the evolution of optical fiber technology, especially in industrial, manufacturing and field environments. A growing concern is the ability of optical fiber systems to withstand the rigors of these more demanding environments, such as extremes in temperature, humidity and the like.

Additionally, the increased demand for optical fiber components, including fiber optic couplers, necessitates mass production of these components, and economies of scale require that such components be manufactured both inexpensively and accurately.

The present invention is directed to a fiber optic coupler package which shows increased resistance to environmental stress, particularly increased resistance to humidity or water leakage, which conditions can obviously be detrimental to the functioning of the coupler. Surprisingly, the fiber optic coupler packages of the present invention are inexpensive to manufacture and easy to assemble in a mass production environment.

2. Description of Related Art

Reinforcing and sealing of coupled optical fibers is a standard procedure in the field.

U.S. Pat. No. 5,247,598 discloses a reinforcing apparatus for optical fiber couplers having a U-shaped base member which forms a groove, and a cover member for the base member, which is shorter in length than the base member, such that when assembled, a portion of the groove remains exposed on either end of the coupler apparatus. An adhesive is then applied to the exposed groove portions in order to bond the optical fibers and the cover to the base member, and to seal the optical fibers from the environment. However, the cover member is disclosed to be substantially equal in width to the base member, thus leaving a a gap between the cover member and the base member, filled only by the cured adhesive, which may decay with time leaving a possible area for leakage of moisture into the coupler.

U.S. Pat. No. 5,367,591 discloses an optical fiber reinforcing structure having a longitudinal groove in which is placed the exposed fiber portions of coupled optical fibers, which are then fixed to the base with an adhesive deposited at the ends of the longitudinal groove. A cover is then fixed to the reinforcing member to hermetically seal the optical fibers within the groove. However, the cover is not disclosed to completely overlap the groove and the base member.

The above cited disclosures are incorporated by reference herein.

SUMMARY OF THE INVENTION

The present invention is directed to an optical fiber coupler package comprising a base member having a longitudinal groove disposed therein, and a cover member for the base member, wherein the cover member is either shorter or substantially equal in length than the base member and wide enough to completely overlap the groove when placed so as to cover the base member. The method eliminates the need for alignment between the substrate and the cover.

On assembly, the inventive coupler package has placed within the longitudinal groove a moisture resistant adhesive composition and at least a pair of fused, coupled optical fibers. Then a cover member is placed over the longitudinal groove, such that the entire groove width a portion of the outer perimeter of the base member is overlapped by the cover member. The adhesive is applied so that adhesive material contacts both the outer, contact surface of the base member and the inner, contact surface of the cover member. That is to say, adhesive is applied to all surfaces between the cover and the substrate.

The fiber optic coupler package of the present invention has the advantage of increased long-term moisture resistance due to the cover member overlapping the edges of the longitudinal groove, providing increased sealing area between the cover member and the base member, as compared to conventional coupler packages.

Further advantages of the inventive coupler package are its ease of assembly in a mass production environment and its inexpensive production cost. The assembly of the cover member onto the base member of the present invention is simple and does not require a alignment step to ensure proper sealing, due to the increased contact area between the sealing surfaces of the cover and the base. This advantage is obviously a great time-saver in a mass production environment, especially since the coupler packages are rather small and somewhat difficult to manipulate.

Due to the simple design of the inventive coupler package, manufacture thereof is inexpensive, as are the materials of construction. The base member is preferably made of fused silica, while the cover member may be fused silica, or the like.

Also, the increased sealing surface area of the present invention helps prevent decay of the sealing adhesive, since most of the sealing adhesive is covered by the cover-overlap area, limiting the environmental exposure of the adhesive.

BRIEF DESCRIPTION OF THE DRAWINGS

The above and other objects, features and advantages of the present invention will be better understood from the following detailed descriptions taken in conjunction with the accompanying drawings, all of which are give by way of illustration only, and are not limitative of the present invention.

DETAILED DESCRIPTION OF THE INVENTION

The following detailed description of the invention is provided to aid those skilled in the art in practicing the present invention. Even so, the following detailed description of the invention should not be construed to unduly limit the present invention, as modifications and variations in the embodiments herein discussed may be made by those of ordinary skill in the art without departing from the spirit or scope of the present inventive discovery.

Figure 1:
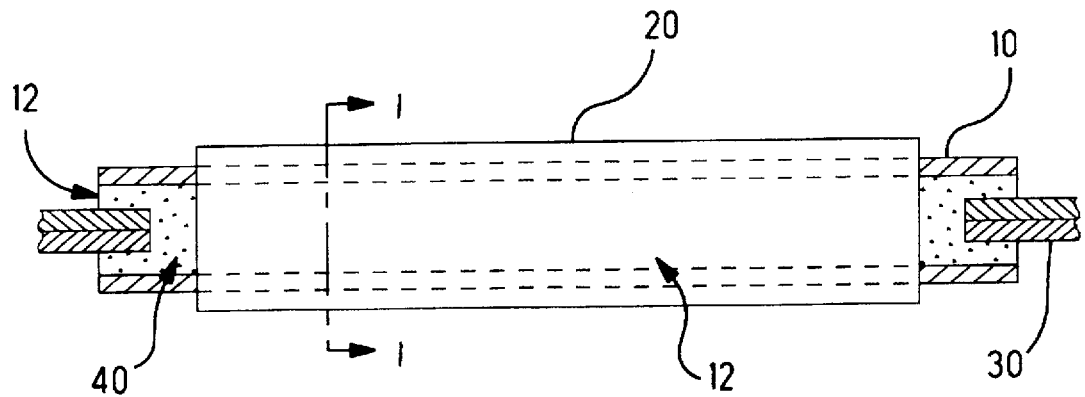
FIG. 1 is a top view of the optical coupler package of the present invention, assembled.
Figure 2:
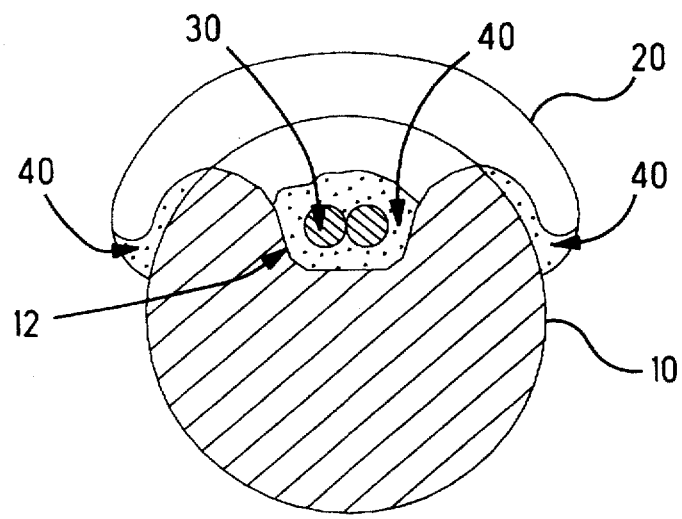
FIG. 2 is a cross-sectional view at points A—A', as depicted in FIG. 1.
Figure 3:
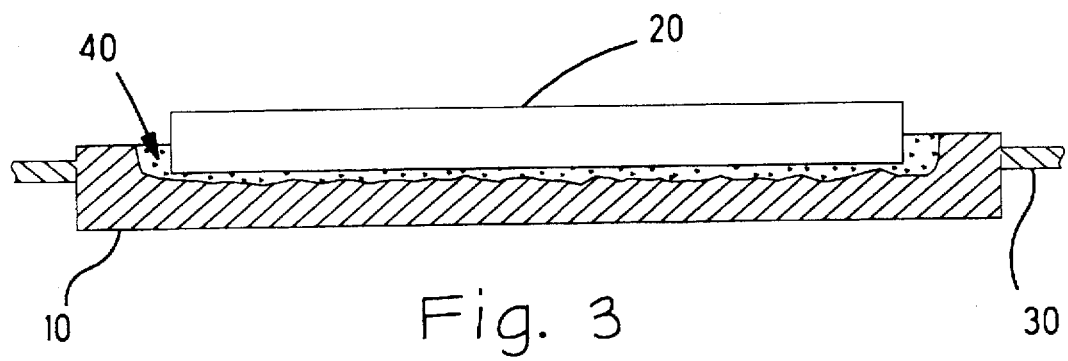
FIG. 3 is a side view of the optical coupler package of the present invention.
Figure 4:
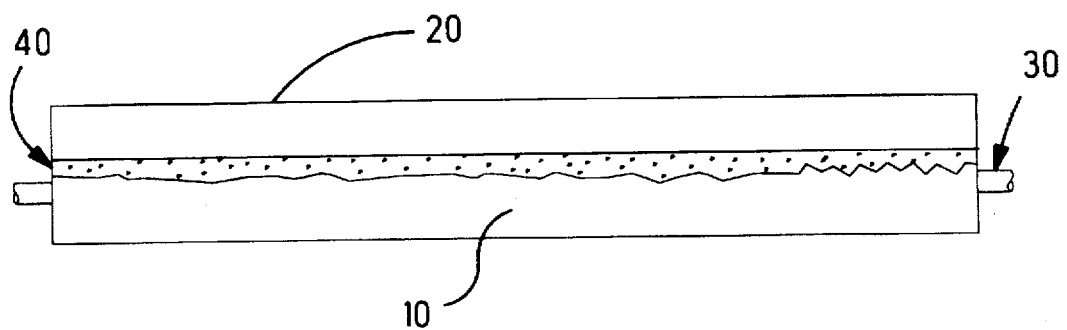
FIG. 4 is a side view of the optical coupler having a cover member substantially the same length as the base member.

The optical fiber coupler package of the present invention, FIGS. 1–3, comprises an base member, 10, having a longitudinal groove, 12, disposed therein, and a cover member, 20, for the base member, wherein the cover member is shorter in length than the base member or equal in length to the base member and wide enough to completely overlap the groove and a portion of the outer perimeter of the base member when placed so as to cover the base member.

The base member may be substantially cylindrical in shape, although the present inventors believe that base members of varying shapes may be used in the invention, and may formed of various suitable materials. It is preferable that the base member be made of a material having a similar coefficient of expansion to that of the optical fibers to be supported therein, in order to minimize deformation and movement of the fibers, relative to the base member, upon exposure of the optical fiber coupler package of the invention to extremes of temperature. A particularly suitable material is fused silica, although other materials may be used, such as Invar.

In the optical fiber couplers of the present invention the longitudinal groove extends the entire length of the base member, and the groove has a width sufficient to support at least two optical fibers 30. It is of course within the scope of the invention to increase the width of the coupler package to accommodate more than two fibers, for example 1XN or MXN couplers, based on fused taper technology.

The cover member of the present invention has a half-tube shape, which may be understood to resemble a portion of tubing which has been sliced in half, longitudinally. The cover member of the invention is configured to have an interior radius of curvature matching or exceeding the exterior radius of curvature of the base member, and an arcuate dimension which is larger than the width of the longitudinal groove in the base member, such that the cover member completely covers and overlaps the groove to form a humidity resistant container for the fused optical fibers, when sealed. The cover member may be formed of fused silica or Invar.

In another embodiment, the optical fiber coupler package of the invention comprises an elongate base member having a longitudinal groove disposed therein, at least two coupled optical fibers disposed in the longitudinal groove, and a cover member for the base member, wherein the cover member is shorter in length than the base member and wide enough to overlap the groove when placed so as to cover the base member.

The fused optical fibers are adhesively affixed in the base member by a suitable adhesive, 40, disposed at either end of the longitudinal groove. The adhesive is either organic or inorganic, and can include a glass solder to attach the fibers to the substrate.

Additionally, after placement of the fused optical fiber, evanescent coupler into the longitudinal groove of the base member, the cover member of the invention is to be affixed to the base member with the adhesive on both of its longitudinal sides and both of its ends. The cover member adhesive may be the same or different than that used to affix the fibers within the longitudinal groove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An optical fiber coupler package comprising:

an elongate base member having a longitudinal groove disposed therein, and a cover member for said base member, wherein said cover member is shorter in length than said base member and has a width sufficient to overlap said groove and a portion of an outer perimeter of said base member when placed so as to cover said base member.

2. The optical fiber coupler according to claim 1, wherein said base member is substantially cylindrical in shape.

3. The optical fiber coupler according to claim 2, wherein said cover member has a half-tube shape having an interior radius of curvature at least equal to the exterior radius of curvature of said base member, and an arcuate dimension which is larger than the width of the groove.

4. The optical fiber coupler according to claim 1, wherein said longitudinal groove extends the entire length of said base member, and said groove has a width sufficient to support at least two optical fibers.

5. An optical fiber coupler package comprising:

an elongate base member having a longitudinal groove disposed therein, at least two coupled optical fibers disposed in said longitudinal groove, and a cover member for said base member, wherein said cover member is shorter in length than said base member and has a width sufficient to overlap said groove and a portion of an outer perimeter of said base member when placed so as to cover said base member.

6. The optical fiber coupler according to claim 5, wherein said base member is substantially cylindrical in shape.

7. The optical fiber coupler according to claim 6, wherein said cover member has a half-tube shape having an interior radius of curvature at least equal to the exterior radius of curvature of said base member, and an arcuate dimension which is larger than the width of the groove.

8. The optical fiber coupler according to claim 5, wherein said groove extends the entire length of said base member, and said groove has a width sufficient to support at least two optical fibers.

9. The optical fiber coupler according to claim 5, wherein said optical fibers are adhesively attached to said base member by an adhesive disposed at either end of said longitudinal groove.

10. The optical fiber coupler according to claim 5, wherein said cover member is affixed to said base member with a moisture-resistant adhesive on both of its longitudinal sides and both of its ends.

11. An optical fiber coupler package having an elongate base member of a prescribed length and width with a longtudinal groove therein for receiving at least two optical fibers, and a cover for said base, characterized in that:

said cover has a length less than the length of said base and a width greater than the width of said base.

* * * * *